T. H. SEELY.
MACHINE FOR PREPARING WELTS.
APPLICATION FILED SEPT. 27, 1912.
1,143,078.
Patented June 15, 1915.
6 SHEETS—SHEET 5.
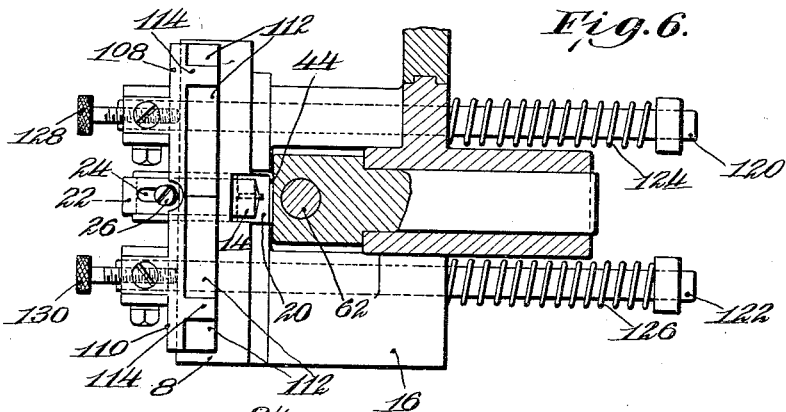
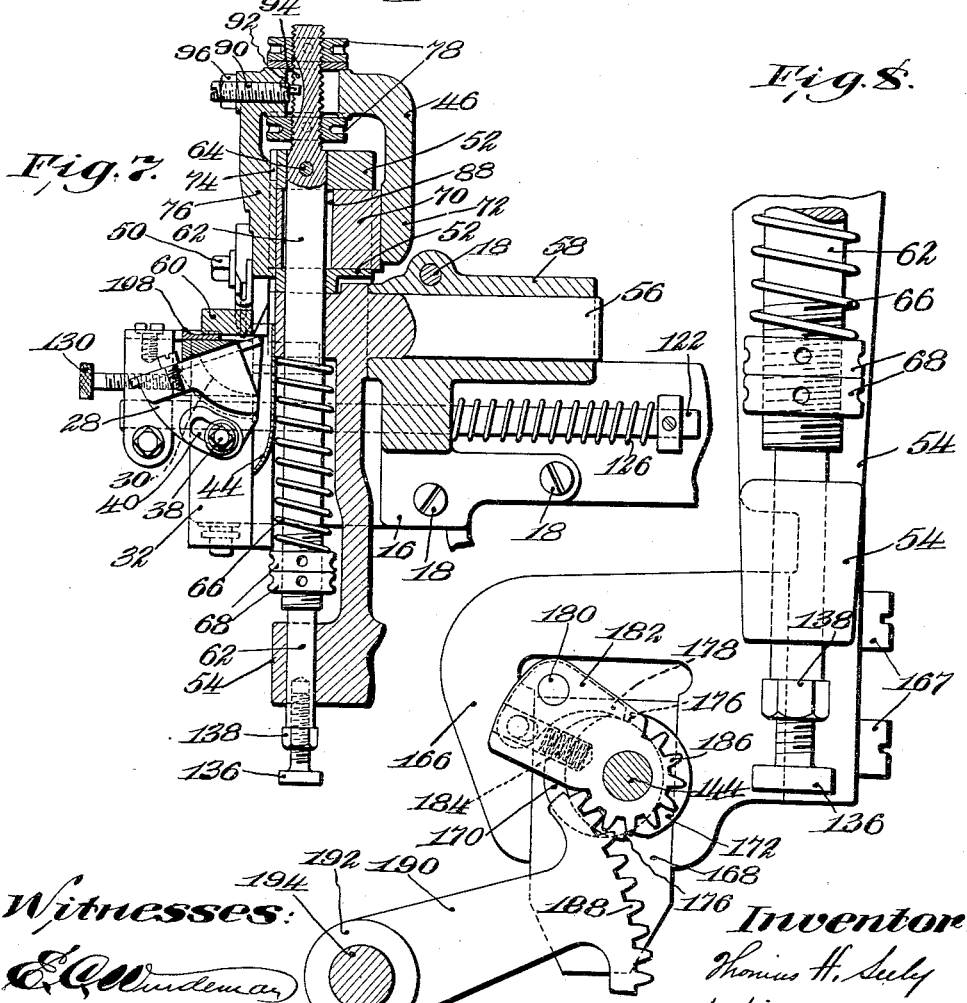
Witnesses:
E. C. Wudeman
George E. Stebbins.
Inventor:
Thomas H. Seely
by his attorneys
Phillips Van Everen Fish

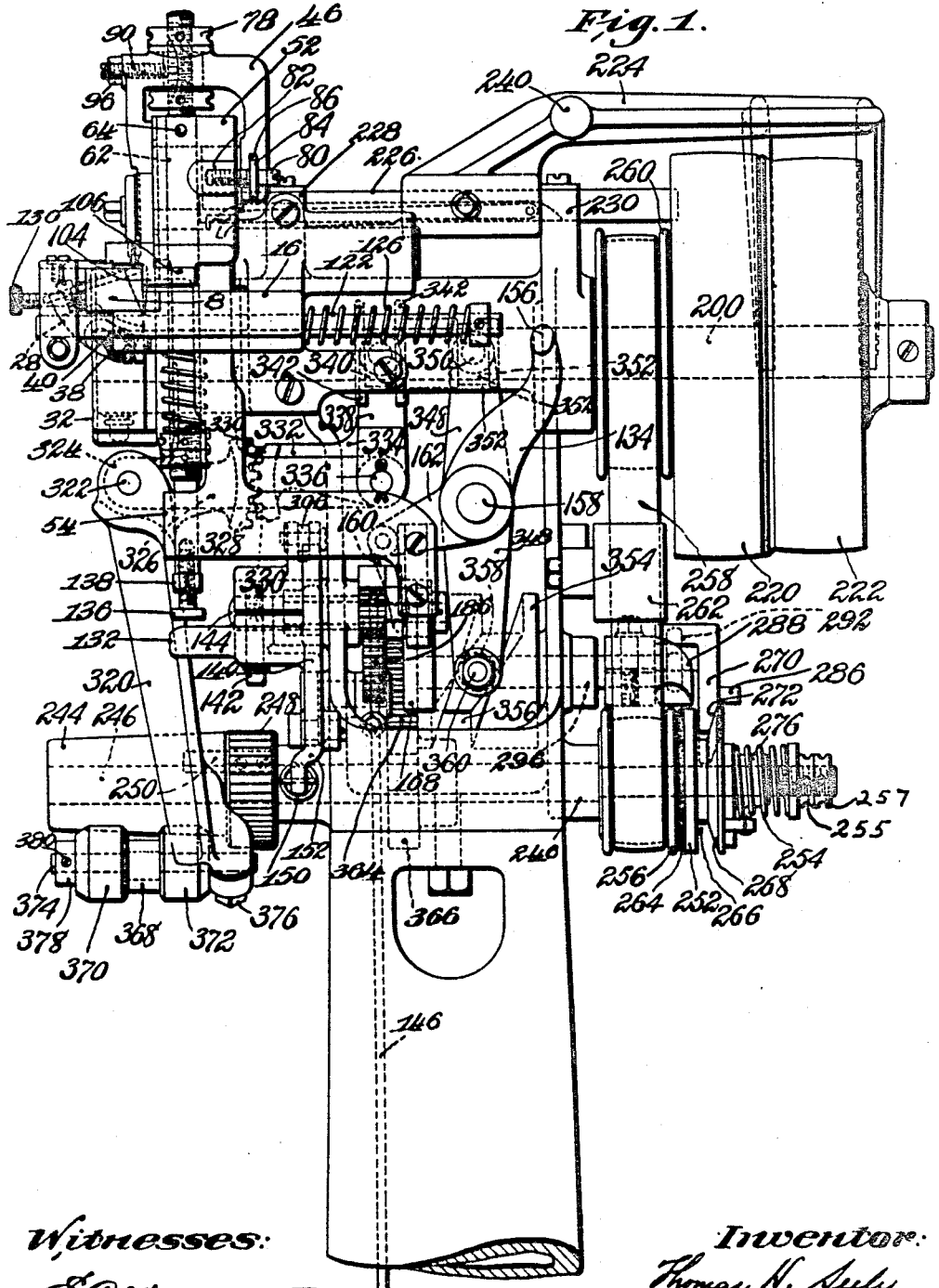

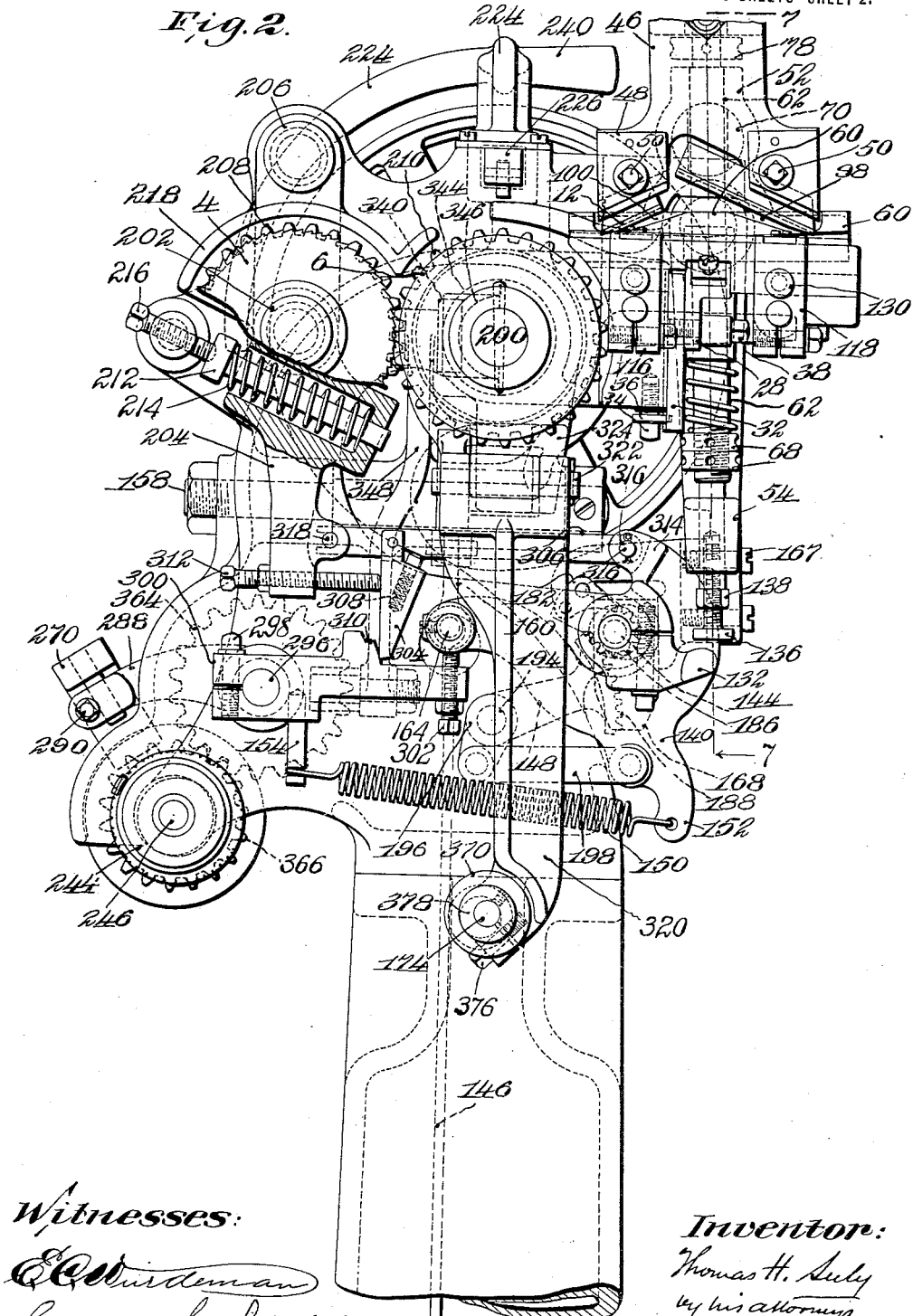

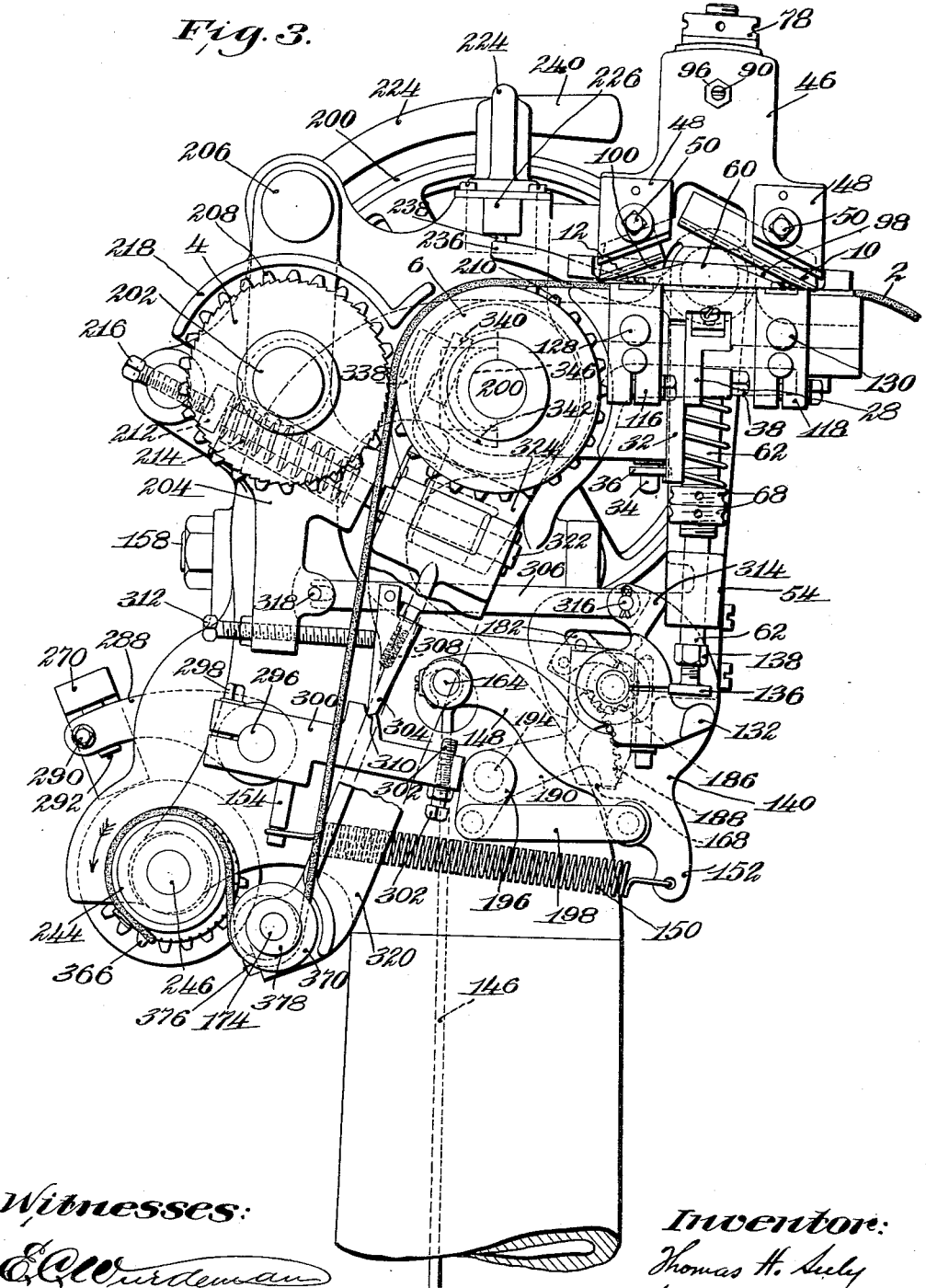

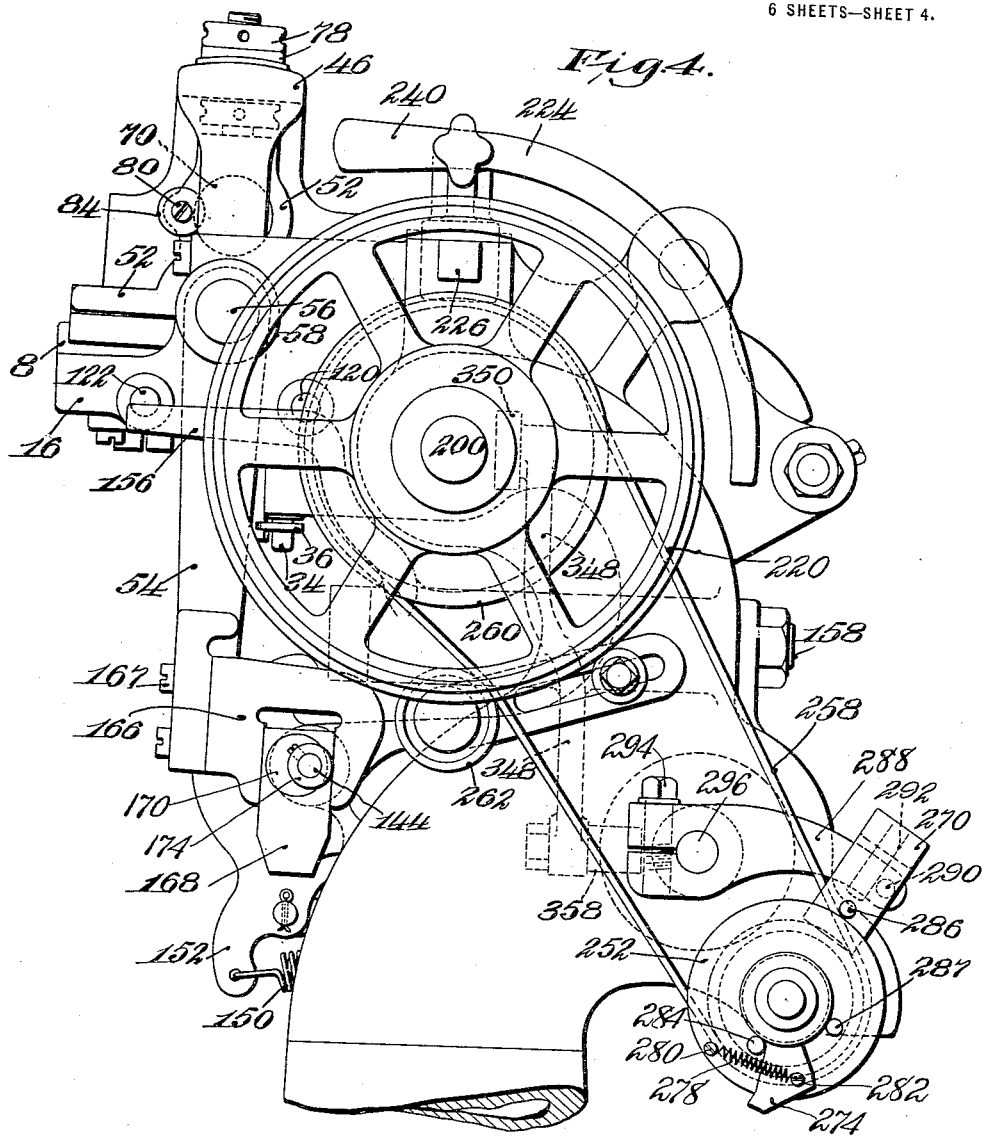
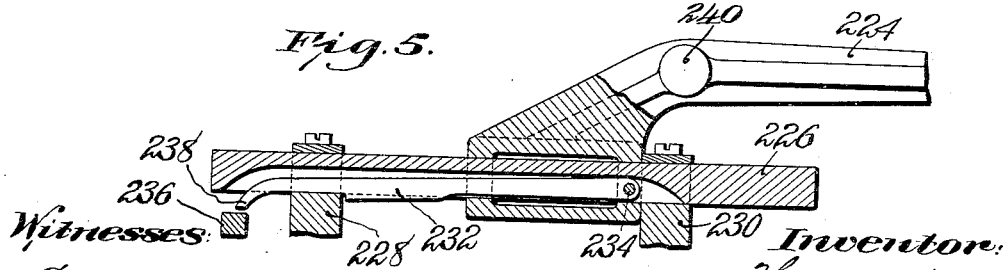

T. H. SEELY.
MACHINE FOR PREPARING WELTS.
APPLICATION FILED SEPT. 27, 1912.

1,143,078.

Patented June 15, 1915.
6 SHEETS—SHEET 6.

Witnesses
Edward S. Day
George C. Stebbins

Inventor
Thomas H. Seely
by his attorneys

UNITED STATES PATENT OFFICE.

THOMAS HERBERT SEELY, OF BOSTON, MASSACHUSETTS, ASSIGNOR TO UNITED SHOE MACHINERY COMPANY, OF PATERSON, NEW JERSEY, A CORPORATION OF NEW JERSEY.

MACHINE FOR PREPARING WELTS.

1,143,078.  Specification of Letters Patent.  Patented June 15, 1915.

Application filed September 27, 1912. Serial No. 722,570.

*To all whom it may concern:*

Be it known that I, THOMAS HERBERT SEELY, a citizen of the United States, residing at Dorchester, Boston, in the county of Suffolk and State of Massachusetts, have invented certain new and useful Improvements in Machines for Preparing Welts; and I do hereby declare the following to be a full, clear, and exact description of the invention, such as will enable others skilled in the art to which it appertains to make and use the same.

The present invention relates to machines for preparing welts and more particularly to machines for grooving and beveling a welt strip preparatory to its use in a welt sewing machine.

One object of the present invention is to produce a welt grooving and beveling machine which is capable of grooving and beveling the entire length of the welt strip.

Another object of the present invention is to provide improved means for reeling the welt after it has been operated upon by the cutting knives.

Another object of the present invention is to provide the machine with mechanism for automatically stopping the welt reeling mechanism.

Still other objects of the present invention are to improve certain details of construction of welt grooving and beveling machines, the advantages of which will be apparent to one skilled in the art, from the following description.

With the above objects in view, the present invention consists in the machine for preparing welts hereinafter described and particularly pointed out in the claims.

Figure 9:
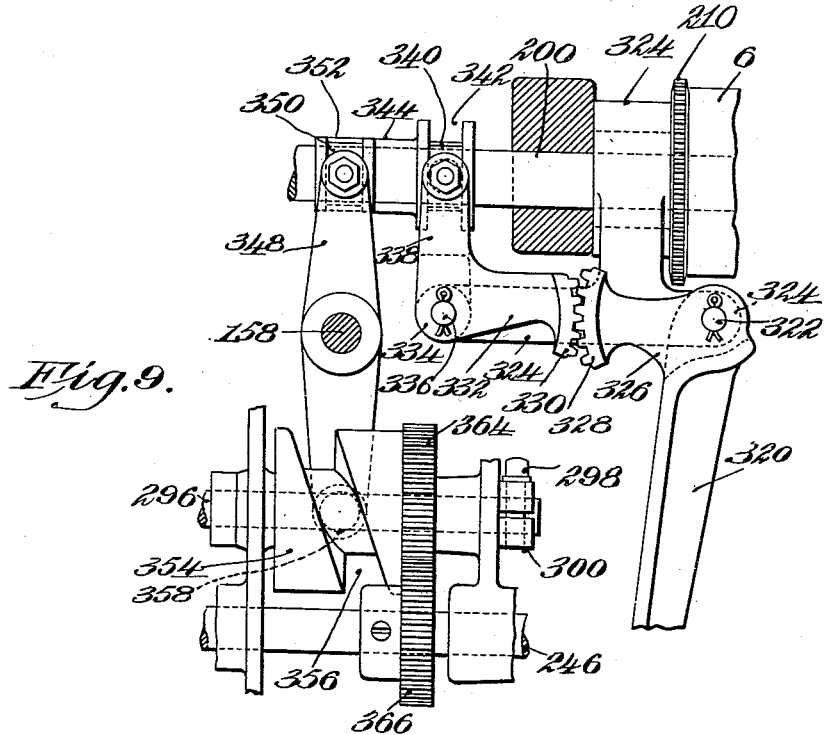
Figures 10, 11:
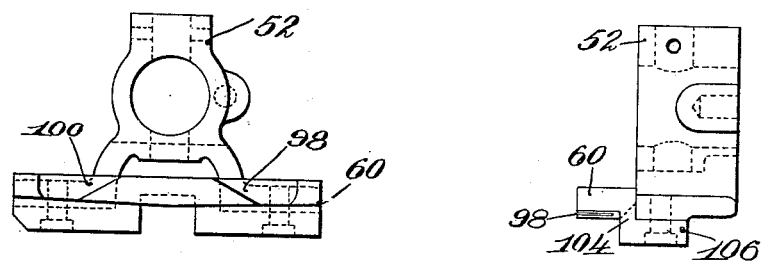

In the drawings, which illustrate the preferred embodiment of the present invention, Figure 1 is a side elevation of the head of the machine; Fig. 2 is a front elevation of the head of the machine; Fig. 3 is a front elevation of the head of the machine, similar to Fig. 2, but showing the parts in a different position; Fig. 4 is a rear elevation of the head of the machine; Fig. 5 is a detail view of the belt shipper lock; Fig. 6 is a detail view showing a plan of the work table; Fig. 7 is a detail of a section taken along the line 7—7 of Fig. 2; Fig. 8 is a detail showing part of the mechanism for rocking the grooving knife carrier; Fig. 9 is a detail view of the mechanism for oscillating the welt guide arm; Fig. 10 is a front view of the presser foot and its carrier detached; and Fig. 11 is a side view of the presser foot and its carrier detached.

Referring to the drawings, the welt strip 2 is fed through the machine by means of feed rolls 4 and 6 respectively, and is drawn over a work table 8 where it is operated upon by grooving knives 10 and 12 respectively for cutting a stitch receiving groove, and by a two-edged beveling knife 14 for beveling the edge of the welt which lies against the upper when the welt is sewed onto a lasted shoe. The carrier which holds the grooving knives 10 and 12 is arranged to be rocked, so that the knife 10 is positioned to groove the welt when the welt is drawn forward across the work table by means of the feed rolls 4 and 6, and the knife 12 is positioned to groove the welt when it is dragged backward across the work table by hand. The beveling knife 14 has two oppositely directed cutting edges which bevel the welt when it is drawn either forward or backward across the work table.

The work table 8 is formed by a flat-topped steel plate or block which is rigidly mounted on a bracket 16 which in turn is rigidly mounted on the machine frame by means of the screws 18. The middle of the work table is cut away on its under side to receive the beveling knife 14 which is upwardly and rearwardly inclined and projects through a hole 20 in the rear of the top surface of the work table 8. The beveling knife 14 consists of a substantially triangular blade portion which projects through the hole 20 and a shank 22 of a substantially rectangular cross section. The shank 22 is slotted at 24 to receive a screw 26 which clamps the knife on an angularly adjustable knife carrier 28. The knife carrier 28 has a curved rib 30, shown in dotted lines in Fig. 7, which is received in a slot in a vertically adjustable plate 32. The rib 30 and its receiving slot are struck about a center which is approximately the point of intersection of the cutting edges of the knife 14 with the top of the work table 8. The knife can, therefore, be angularly adjusted to change the angle of bevel of the welt without changing the depth of the bevel cut. The plate 32 is splined to the bracket 16 to hold it in vertical alinement and is vertically adjusted by means of a screw 34 provided with a flange 36 engaging a slot in the side of the plate 32 (see Fig. 3). A clamping screw 38 received through a curved slot 40 in the knife carrier 28 (being screwed into a threaded hole in the plate 32) holds these parts firmly in adjusted position. A deflector or a guard plate 44 guides the chip cut by the beveling knife downward and prevents it from getting into the machine so that it falls freely out from the bottom of the work table.

The backwardly and forwardly directed grooving knives 10 and 12 respectively are of a substantially J-shaped cross section, and are each clamped in place on the front of the knife carrier 46 by means of clamping blocks 48 held in place by clamping screws 50. The knives 10 and 12 are longitudinally adjustable so that they may be moved down as their cutting edges are ground away by sharpening. The knife carrier 46 is arranged to be rocked slightly to bring the backwardly directed grooving knife 10 nearer the work table 8 in position to groove the welt when the welt is drawn forwardly over the work table 8 by the feed rolls 4 and 6 and to bring the forwardly directed grooving knife 12 nearer the work table in position to groove the welt when the welt is drawn backwardly over the work table. The knife carrier 46 is a substantially U-shaped frame, as shown in Fig. 7, and is adjustably mounted on a substantially yoke-shaped supporting block 52, which, in turn, is mounted upon a rocking supporting frame 54. The rocking supporting frame 54 is provided with a stud 56 journaled in a bearing 58 in the bracket 16, and the frame 54 is arranged to be rocked on the stud 56 by mechanism which will be hereinafter described. The yoke-shaped supporting block 52 may, for convenience, be designated as the presser foot carrier because upon it is mounted the presser foot 60. The presser foot carrier 52 is supported by the rocking supporting member 54 being mounted thereon by means of a rod 62 which is slidingly held in the rocking frame 54. The rod 62 passes through the presser foot carrier 52 and is rigidly held therein by a pin 64. A helical compression spring 66, surrounding the rod 62 and adjusted by the nuts 68, normally holds the presser foot carrier 52 against the top of the rocking frame 54, but allows the presser foot carrier 52 and knife carrier 46 to be lifted from the rocking frame 54 against the tension of the spring 66. A cylindrical block 70 is loosely mounted in the presser foot carrier 52. The rear face of the block 70 is plain and fits against the inner face of the rear leg 72 of the U-shaped knife carrier 46. The front face of the cylindrical block 70 is provided with a tongue 74 which engages a groove in the inner face of the front leg 76 of the knife carrier 46, so that the knife carrier 46 may be adjusted vertically with respect to the block 70 and presser foot carrier 52. The upper end of the rod 62 is screw-threaded and carries adjusting nuts 78 which may be turned to vertically adjust the knife carrier 46 relatively to the block 70 and presser foot carrier 52. The knife carrier 46 is adjusted forwardly and backwardly with respect to the presser foot carrier 52 by means of an adjusting screw 80 threaded in a lug 82 on the presser foot carrier 52 and having a peripheral flange 84 which engages in a groove 86 in the side of the rear leg 72 of the knife carrier 46. The aperture 88 in the block 70 through which passes the rod 62, is elongated so that the knife carrier 46 and the cylindrical block 70 may be adjusted forwardly and backwardly relatively to the presser foot carrier 52 so that the grooving knives 10 and 12 may be adjusted to vary the position of the groove in the welt. In order to provide a fine adjustment so that when the frame 54 is rocked, the knives 10 and 12 may be alternately positioned the same distance above the work table to cut grooves of exactly the same depth, an adjusting screw 90 is provided. The end of the screw is provided with a stud 92 which is eccentric to the axis of the screw and received in a groove 94 cut in the side of the rod 62. When the adjusting screw 90 is turned, the eccentric stud 92 causes a relative movement between the knife carrier 46 and the cylindrical block 70 on the one hand and the rod 62, the presser foot carrier 52 and the rocking frame 54 on the other hand. The cylindrical block 70, to which the knife carrier is splined, turns in the presser foot carrier 52 and forms the axis about which the knife carrier 46 is adjusted by the screw 90. The adjusting screw 90 is locked by means of a lock-nut 96.

The presser foot 60 is an elongated plate of substantially the same length as the work table 8. The under surface of the presser foot which lies over the work table has its two halves inclined to each other at a very obtuse angle, as shown in Figs. 2, 3 and 10, so that when the knife carrier is rocked to depress the grooving knife 10, the under face of the presser foot adjacent the grooving knife 10 is parallel with the top of the work table 8, and so that when the grooving knife 12 is depressed the under face of the presser foot adjacent the grooving knife 10 is parallel with the top of the work table 8. The presser foot over the top of the work table is cut away at two places 98 and 100 so that the grooving knives 10 and 12 project through and below the bottom of the presser foot. The presser foot at the rear of the work supporting surface of the work table 8 has a downward projection 104 (Figs. 1 and 11), which fits against the back of the work table and holds the presser foot 60 with its carrier 52 and the knife carrier 46 and the rod 62 and so holds from turning about the rod 62 and so holds the presser foot 60 and the grooving knives 10 and 12 in alinement with the work table. The presser foot 60 is rigidly mounted upon the presser foot carrier 52 by screws connecting the rearward extension 106 (Figs. 1 and 11) of the presser foot to the bottom of the presser foot carrier 52. It will be noted that the knife carrier 46 and the grooving knives 10 and 12 are adjustable relatively to the presser foot 60 and its carrier 52 by means of the adjusting screw 80 so that a fine adjustment of the grooving knives relative to the presser foot may be had to accurately position the stitch receiving groove in the welt.

The presser foot 60 acts as a top gage to hold the welt firmly against the top of the work table 8 and the downward extension 104 at the rear of the presser foot forms a back edge or side gage for the rear edge of the welt. To position the welt on the work table, two edge or side gages 108 and 110 are provided which bear against the front edge of the welt to hold it snugly against the rear edge gage formed by the downwardly extending flange 104 of the presser foot. The edge gages 108 and 110 are thin metal plates which slide over the top of the work table 8. The parts 112 of the edge gages which come under the presser foot are made thinner, so that a thin welt may be operated upon, leaving two portions 114 of the full thickness under the cut-away portions 98 and 100 of the presser foot. The edge gages 108 and 110 are mounted on blocks 116 and 118 respectively. The blocks 116 and 118 are mounted on the front ends of the sliding bars 120 and 122 which are slidingly mounted in the bracket 16 and are drawn rearwardly by means of helical springs 124 and 126 to hold the edge gages 108 and 110 against the welt. Adjustable stop screws 128 and 130 are threaded through the blocks 116 and 118 respectively and bear against the front of the work table 8 to limit the backward movement of the edge gages 108 and 110 over the work table. The stop screws 128 and 130 are preferably adjusted so that the distance between the rear edge gage 104 on the presser foot and the edge gages 108 and 110 will be the width of the welt which is being operated upon. It will be noted that the edge gages 108 and 110 are separately mounted. In case an irregular enlargement in the welt strip is drawn over the work table, the two edge gages 108 and 110 will yield more easily independently of each other and with less binding of the slide rods 120 and 122 than would a single edge gage of the combined length of the two edge gages.

In order to lift the presser foot 60 and move the edge gages 108 and 110 forward so that a welt may be placed upon the work table in the position to be operated upon by the grooving and beveling knives, treadle operated lever arms 132 and 134 are provided which are arranged to reciprocate the sliding bar 62 and the sliding bars 120 and 122 respectively. The arm 132 contacts with the head of an adjustable screw 136 in the bottom of the sliding bar 62 and raises the presser foot and the grooving knives against the tension of the spring 66. The screw 136 may be turned to vary the amount the arm 132 lifts the presser foot and is locked in adjusted position by means of a lock-nut 138. The arm 132 is formed on a lever 140 which has a number of other arms and which is clamped by means of a clamping bolt 142 on the end of a shaft 144 which is journaled in the machine frame. The lever 140 is turned to raise the arm 132 by means of a connecting rod 146 connected to an arm 148 on the lever 140 and arranged to be drawn downwardly by means of a treadle (not shown) at the base of the machine. A helical spring 150 connected between the arm 152 on the lever 140 and a stud 154 holds the connecting rod 146 elevated and the arm 132 depressed.

The lever arm 134 has a cross bar 156 at its free end which contacts with both of the slide rods 120 and 122 when the lever arm 134 is turned to the left, as viewed in Fig. 1. The lever arm 134 is journaled on a stud 158 fixed on the machine frame and is turned to bear against the slide bars 120 and 122 by means of a link 160 which forms the connection between an arm 162, integral with the lever arm 134, and a stud 164 which is mounted in the end of the arm 148 and to which the connecting rod 146 is attached so that when the connecting rod 146 is depressed, the lever 134 is turned to the left, as viewed in Fig. 1. The free ends of the lever arms 132 and 134 are relatively spaced from the slide bars 62 and 120 and 122 respectively, so that when the connecting rod 146 is depressed by the treadle, the lever 132 will engage the slide rod 62 and raise the presser foot 60 and grooving knives before the lever 134 engages the slide bars 120 and 122 to move the edge gages 108 and 110 forward. Conversely, when the treadle is released, the springs 124 and 126 will position the edge gages before the spring 66 is released to draw the presser foot down. Consequently, the welt will be positioned laterally on the work table before it is engaged by the presser foot. Since the presser foot clamps the work against the top of the work table, it is obvious that it is of advantage to position the welt laterally before the presser foot engages it to hold it down upon the table.

In order to rock the knife carrier 46 to alternately lower the grooving knives 10 and 12 in position to groove the welt, the rocking frame 54 has at its lower end a backward extension to which is secured by means of bolts 167 a substantially U-shaped laterally extending block 166, in which is slidingly mounted a slide block 168. The slide block 168 is mounted upon an eccentric 170 which is formed on the rear end of a sleeve 172 which is mounted to rotate on the rear end of the shaft 144 which is supported in the machine frame. A collar 174 is pinned to the end of the shaft 144 to hold the eccentric sleeve 172 in place. On the forward end of the sleeve 172 are formed two ratchet teeth 176 which are arranged to be engaged by a rotating pawl 178 to turn the sleeve 172 and eccentric 170 through an angle of 180° thus alternately rocking the frame 54 to the right and left. The pawl 178 is pivotally mounted by means of a pin 180 to a pawl carrier 182 which is rotatably mounted upon the shaft 144. A helical compression spring 184 holds the pawl 178 against the sleeve 172. In order to rotate the pawl carrier 182, gear teeth 186 are formed on the pawl carrier which mesh with the teeth of a segmental gear 188 formed on the end of a rocking arm 190, so that when the rocking arm is lifted the pawl carrier 182 is rotated to the right, as viewed in Fig. 8, through an angle of a little over 180°, the pawl 178 engages one of the ratchet teeth 176 and turns the sleeve 172 through an angle of 180°, thus rocking the knife carrier 46. The initial position of the pawl 178 is a little behind the ratchet teeth 176, so that the engagement of the pawl and ratchet teeth will always be assured. Consequently, the pawl carrier 182 must be rotated through an angle of 180° plus the small angular distance necessary to bring the pawl 178 into engagement with the teeth 176. The rocking arm 190 is formed on a hub 192 rotatably mounted on a stud 194 fixed to the machine frame and having a second arm 196. A link 198 is connected between the end of the arm 196 and the arm 152 so that when the arm 152 is moved to the right, as shown in Fig. 3, by the depression of the treadle, the segmental gear 188 is raised to turn the eccentric and rock the knife carrier. It will thus be seen that the knife carrier is rocked to alternately bring the grooving knives 10 and 12 into position to groove the welt by depressing the treadle. When the treadle is released, the arm 152 is drawn to the left, as shown in Fig. 3, by means of the spring 150 and the segmental gear 188 moves downward to the position shown in Fig. 8, turning the pawl carrier 182 backward so that the pawl 178 moves backward around the sleeve 172 into position to engage one of the ratchet teeth 176. The friction of the sleeve 172 on the shaft 144 and the friction of the eccentric 170 in the sliding block 168 prevents the sleeve 172 from turning backward.

The feed roll 6 is mounted directly on the driving shaft 200 of the machine. The feed roll 4, which has its surface roughened to afford a better grip on the welt, is mounted on a stud 202 formed on a swinging arm 204 which is hung from a supporting stud 206 as a pivot. On the rear ends of the feed rolls 4 and 6 are formed gears 208 and 210 respectively so that the feed roll 4 is driven by the feed roll 6. A pin 212 slidingly mounted in the swinging frame 204 is pressed outwardly by means of a spring 214 against an adjusting screw 216 mounted in the machine frame so that the two feed rolls 4 and 6 are spring-pressed against each other with an adjustable amount of pressure. A guard plate 218 protects the operator from the feed rolls and their gearing.

On the rear of the driving shaft 200 are mounted a fixed pulley 220 and an idle pulley 222. A belt shipper 224 having a handle 240 is provided for shifting the belt from one pulley to the other. The belt shipper 224 is mounted on a bar 226 which is slidingly mounted in lugs 228 and 230 projecting from the top of the machine frame. A latch piece 232 is mounted by means of a pin 234 in a recess in the bottom of the slide bar 226. The latch 232 is drawn downward by gravity so that, unless it is held up, when the belt shipper is at its rearward position, the latch 232 will engage behind the lug 228 and lock the belt shipper in its rearward position. A finger 236 projects from the rocking frame 54 beneath a downward extending finger 238 on the front end of the latch 232 so that when the rocking frame 54 and the knife carrier 46 are rocked to depress the backwardly directed knife 10 into operating position, the latch 232 will be lifted and the operator can draw the belt shipper forward and shift the belt from the idle to the fixed pulley to start the machine. When, however, the rocking frame and knife carrier are positioned to depress the forwardly directed grooving knife 12, as shown in Fig. 2, the finger 236 is depressed so that the latch 232 is free to fall and lock the belt shipper with the belt on the idle pulley and the machine cannot be started. The operator of the machine, therefore, cannot start the machine unless the grooving knives are rocked in a position to groove the welt when it is drawn forwardly through the machine by the feed rolls.

The welt 2 as it comes from the feed rolls 4 and 6 is wound on a reel 244. The reel 244 is a sleeve of slightly conical shape, mounted on the forward end of a frictionally driven shaft 246. An eccentric sleeve 248 is mounted just at the rear of the reel and has a finger 250 extending over the reel so that the sleeve 248 may be turned to clamp the end of the welt between the reel 244 and the finger 250, as shown in Fig. 3. When the rotation of the welt reel 244 is stopped by the stop finger 270, the momentum of the welt roll tends to carry it forward and to move the finger 250 of the eccentric sleeve 248 with it and so to loosen the grip of the finger 250 on the end of the welt strip. It is found that the momentum of the welt roll is hardly sufficient to disengage the finger 250 from the end of the welt and the operator has to turn the eccentric sleeve a little to disengage the end of the welt. However, the action of the momentum of the welt roll is to loosen rather than tighten the grip of the finger 250 on the welt.

On the rear of the shaft is splined a friction plate 252 which is pressed by means of a spring 254 against the side of a pulley 256 which is loosely mounted on the shaft 246 and which is continuously driven when the machine is running by means of a belt 258 running over a pulley 260 on the driving shaft of the machine. A belt tightener 262 is provided to keep the belt under tension. A leather friction washer 264 is mounted on the friction plate 252. The pulley 256 is arranged to be driven more rapidly than the normal rotation of the shaft 247 so that the pulley 256 turns relatively to the friction plate 252, and the shaft 246 is driven by the frictional drag between the pulley and the friction plate. Thus the shaft 246 and the reel 244 are driven so as always to keep a tension on the welt which is being wound and to allow the speed of the reel 244 to decrease as the welt roll increases in size. The pressure with which the spring 254 holds the friction plate 252 against the pulley 256 can be varied by the adjusting nut 255 so that the tension under which the welt is wound on the reel 244 can be varied. The nut 255 is locked in place by the lock-nut 257. The friction plate 252 has a peripheral slot 266 cut therein, the rear face 268 of which is beveled. A stop finger 270 is arranged to engage in the slot 266 to stop the rotation of the shaft 246. The stop finger 270 has a beveled surface 272 which, when the stop finger 270 is pressed into the slot 266, engages the beveled surface 268 and moves the friction plate 252 out of contact with the pulley 256, so that the shaft is no longer frictionally driven. The friction of the stop finger 270 in the slot 266 quickly brakes the shaft 246. In order to stop the welt reel 244 so that the welt holding finger 250 is at the top of the reel in convenient position for the operator to secure the end of the welt, a stop arm 274 is rotatably mounted on the hub 276 of the friction plate 252. A helical spring 278 connected between a pin 280 on the friction plate 252 and a pin 282 on the arm 274 draws the arm 274 forwardly and normally holds it against a pin 284 on the rear face of the friction plate 252. When the reel is to be stopped, the stop finger 270 is pressed into the slot 266 and frictionally retards the rotation of the reel. The friction of the stop finger 270 in the slot 266 does not immediately stop the reel, which continues to turn until the stop arm 274 contacts with a lug 286, which is mounted on the stop finger 270 and which is moved into the path of the arm 274 when the stop finger 270 is pressed into the slot 266. When the stop arm 274 is arrested by the lug 286, the pin 280, which is fast on the friction plate 252, stretches the spring 278, the tension of which opposes the rotation of the reel and quickly brings it to rest. In case the resistance of the spring 278 is insufficient to stop the reel, the reel is positively stopped by the lug 287 on the rear face of the friction plate 252 which contacts with the back of the stop arm 274. The friction of the finger 270 in the slot 266 and the cushioning effect of the spring 278 are such that, while the contact of the lug 287 against the arm 274 positively stops the rotation of the reel, the lug 287 does not strike sufficiently hard to damage the mechanism. The stop arm 274 is so located on the shaft 246 in angular relation to the finger 250 that when the reel is stopped by contact of the stop arm 274 with the lug 286, the welt holding finger 250 is at the top of the reel in position for the operator to readily secure to the reel the end of the next strip of welting which is passed through the machine.

The welt reel 244 is arranged to be stopped whenever a loose end of welt passes from between the feed rolls 4 and 6. The feed rolls 4 and 6 are yieldingly pressed together so that whenever a loose end of welting passes from between them, whether it be the last end of the entire strip of welt or it be the loose end caused by a break in the welt, the feed rolls move together to set into operation mechanism which presses the stop finger 270 into the groove 266 to arrest the rotation of the welt reel 244. This automatically stops the welt reel when the full length of the welt has been run through the machine and also automatically stops the welt reel in case there is a break in the welt. In either case, the welt reel is prevented from running free when it is not winding the welt, and the danger and inconvenience of having a loose end of the welt fly out from the rotating welt reel, is obviated. In order to operate the stop finger 270 as above described, it is mounted across the end of the rock arm 288. The end of the rock arm 288 is split and is arranged to be clamped by means of a bolt 290 on a stud 292 held in the stop finger 270 by a driving fit so that the stop finger may be adjusted on the arm 288. The hub of the rock arm 288 is clamped by means of a bolt 294 on the rear end of the rock shaft 296. On the forward end of the rock shaft 296 is clamped, by means of a bolt 298, an arm 300. The spring 150 which is connected to the stud 154 on the arm 300 tends to raise the arm 300 and to hold the stop finger 270 in the groove 266. An adjusting screw 302 in the end of the arm 300 is arranged to engage under the end of the lever 148, so that when the treadle is depressed, the arm 300 is moved downwardly to release the stop finger from the slot 266. The arm 300 is arranged to be held in its lowered position by means of a latch 304 which is mounted on the link 306. A spring 308 holds the latch 304 against the catch shoulder 310 on the arm 300. When the machine is running and the welt is being drawn through the feed rolls, the arm 300 is held depressed, as shown in Fig. 3, so that the welt reel is driven to wind up the welt. In order to stop the welt reel when the end of the welt strip is reached, or in case the welt strip is broken, the latch 304 is arranged to be released by the movement of the roll 4. As soon as the welt strip is drawn from between the drive rolls 4 and 6, the drive roll 4 is pressed directly against the drive roll 6 by the spring 214. An adjustable screw 312 on the swinging frame 204 upon which is mounted the drive roll 4, strikes the latch 304 as soon as the drive rolls come together and trips the latch, moving it off on the catch shoulder 310. The spring 150 thereupon raises the arm 300 and applies the stop finger 270 to stop the rotation of the welt reel. The welt reel cannot again be started until the treadle is depressed. It is obvious that as long as there is no welt strip between the feed rolls 4 and 6 the screw 312 will always be in position to hold the latch 304 away from the stop shoulder 310 so that the welt reel will only operate while a welt is being drawn through the feed rolls.

In order to separate the feed rolls so that a welt strip may be introduced between them, the swinging frame 204 which bears the feed roll 4 is connected by means of the link 306 to an upwardly extending arm 314 on the lever 140. The link 306 is pivotally mounted on the arm 314 by means of a pin 316. The other end of the link 306 is slotted and engages a pin 318 on the swinging frame 204, so that when the treadle is depressed, the arm 314 is moved to the left, as viewed in Figs. 2 and 3, and the link 306 engages the pin 318 swinging the feed roll 4 to the left sufficiently so that the welt may be placed between the two feed rolls.

In order to wind an open work roll of welt on the reel 244, the welt is laid back and forth longitudinally of the reel by means of an oscillating arm 320. The arm 320 is pivotally mounted on a pin 322 which is supported in the front end of a swinging frame 324 so that the arm 320 is capable of a swinging motion back and forth longitudinally of the feed roll. The swinging frame 324 is rotatably hung on the driving shaft 200 back of the feed roll 6 so that the arm 320 is capable of a swinging movement to and from the work reel 244 about the shaft 200 as an axis. The turning movement of the arm 320 and the swinging frame 324 about the shaft 200 is entirely free, so that the arm 320 may freely position itself relatively to the welt reel 244 depending upon the size of the welt roll. The arm 320 is positively oscillated about the pin 322 as an axis by means of a rearwardly extending arm 326 formed integral with the arm 320 and terminating in a segmental gear 328 which engages with the segmental gear 330 formed on the arm 332 of a bell crank lever 334 which is fulcrumed about a pin 336 on the swinging frame 324. The other arm 338 of the bell crank lever 334 carries a sliding block 340 which is mounted to slide in a peripheral groove 342 cut around a block 344. The block 344 is of a substantially U-shaped cross section and has in its face a semi-cylindrical recess 346 (see Fig. 3) which fits half around the driving shaft 200 and forms a sliding bearing so that the block 344 may be reciprocated back and forth on the shaft 200 to oscillate the arm 320. The block 344 is reciprocated by means of a lever 348, the upper end of which bears a block 350 which engages a box 352 cut in the face of the block 344. The bottom of the box 352 is flat so that the block 344 is held without turning on the shaft 200. The bottom of the groove 342 is struck about the axle of the shaft 200 as a center so that the block 340 can move in the groove 342 about the axis of the shaft 200 when the frame 324 swings about the shaft 200 as a pivot. Thus the frame 324 and the lever 338 are free to turn about the shaft 200 relatively to the block 344 between the positions shown in Figs. 2 and 3. The levers 334 and 348 serve to hold the block 344 against the shaft 200. The lever 348 is fulcrumed on the pin 158 which is secured to the machine frame. The lever 348 is oscillated by means of a cam 354 having a peripheral cam path 356 engaged by a roller 358 mounted upon a stud 360 at the lower end of the lever 348. The cam 354 is loosely mounted to rotate on the rock shaft 296, and is driven by means of a gear 364 formed on the cam 354 and meshing with the gear 366 rigidly mounted on the reel shaft 246. The welt laying arm 320 is, therefore, oscillated in timed relation to the rotating welt reel 244 so that the welt is laid in spirals criss-crossing back and forth on the welt roll. The open work roll in which the welt is reeled allows the water in which the welts are soaked before they are sewn to the shoe, to penetrate to every part of the welt roll and to uniformly temper the welt.

The welt guide is mounted on the lower end of the arm 320. This guide comprises a small roll 368 mounted between two larger rolls 370 and 372. The rolls 368, 370 and 372 are mounted on a pin 374 which is held by means of a clamping screw 376 in the lower end of the arm 320 and projects at substantially right angles thereto. The rolls 368, 370 and 372 are held in place by a collar 378 fastened to the pin by a clamping screw 380. The small roll 368 is mounted upon a portion of the pin 374 which is eccentric to the bearings of the rolls 370 and 372 so that while the periphery of the roll 368 extends almost to the peripheries of the rolls 370 and 372 on the side of the welt guide next the welt reel, the periphery of the roll 368 on the side away from the welt reel is considerably below the peripheries of the rolls 370 and 372 so that the sides of the rolls 370 and 372 form a welt guiding slot. As illustrated particularly in Fig. 3, it will be noticed that when the welt is being reeled, the tension on the welt between the feed rolls and welt guide and between the arm 320 to the and welt guide draws the arm 320 to the left so that the welt guide hugs the face of the welt roll which is being wound on the reel. The rolls 370 and 372 allow the surface of the welt roll to freely travel under the welt guide. As the welt roll grows, it pushes the arm 320 more and more to the right, the welt guide always lying against the face of the growing welt roll. Since the welt guide always lies against the face of the welt roll and the guide is reciprocated back and forth longitudinally of the welt roll, a welt roll of substantially the same length or thickness (measured parallel to its axis) throughout will be built up on the reel 244. In other words, the length of the roll at its center will be substantially the same as at its circumference and the roll will have substantially flat ends, as contrasted with the concave ends which a roll of welting would have if it were wound on a reel without flanges by means of a welt guide reciprocated back and forth at a fixed distance from the reel. Moreover, as the welt guide has the same length of travel throughout the winding of the roll and as it lies against the roll, no side flanges need be provided on the reel 244.

The operation of the machine is as follows:—After a welt strip has been operated on and removed as a roll from the reel 244, the machine is ready to groove and bevel another welt strip. Since the previously grooved and beveled strip has been drawn forwardly through the machine, the knife carrier is in a position so that the grooving knife 10 is depressed. The feed rolls 4 and 6 are together so that the latch 304 is tripped and the stop finger 270 engages the friction plate 252. Starting with the machine in this position, the operator depresses the treadle which raises the presser foot 60 and moves the edge gages 108 and 110 forwardly on the welt work table 8. The operator then slips the forward end of the welt strip sidewise onto the work table leaving a length about two feet long at the left of the work table, as viewed in Figs. 2 and 3. The depression of the treadle in raising the presser foot and opening the edge gages rocks the knife carrier so that the forwardly directed knife carrier 12 is depressed into position to groove the welt. Then the treadle is released and the presser foot and edge gage reëngage the welt strip. It will be noted that when the machine is in this position, the finger 236 is depressed so that the operator is unable to start the feed rolls. The operator grasps the welt and pulls it backward across the work table by hand. The grooving knife 12 and the forwardly facing edge of the beveling knife 14 groove and bevel the welt strip to its very forward end so that no welt is wasted. After about two feet of the front end of the welt have been grooved and beveled in this manner, the operator again depresses the treadle and slips the grooved and beveled portion of the welt onto the work table leaving sufficient welt at the left of the table to reach through the feed rolls and down to the welt reel. The operator puts this end between the feed rolls around the welt guiding roller 368 and secures the end on the reel by means of the finger 250. The depression of the treadle turns the eccentric 170 so that the knife carrier is rocked to depress the backwardly directed grooving knife 10. The depression of the treadle also draws down the arm 300 allowing the latch 304 under the action of the spring 308 to engage the catch shoulder 310 so that when the treadle is released, the arm 300 is held depressed by the latch 304 and the friction plate 252 is held against the pulley 256. The welt reel rotating mechanism is, therefore, in position to rotate the welt reel as soon as the power is turned on after the treadle is released. Then the treadle is released and the parts assume the position illustrated in Fig. 3. In this position the latch 232 is raised by the finger 236. The operator then draws the belt shipper 224 forward throwing on the power. The feed rolls 4 and 6 drag the welt across the work table where it is grooved and beveled by means of the knives 10 and 14. The welt reel 244 is frictionally driven so that it reels the welt as fast as it is delivered from the feed rolls, the welt being laid criss-crossed back and forth on the reel by means of the oscillating arm 320. The machine continues to operate to groove and bevel the welt until the last end of the welt strip passes between the feed rolls 4 and 6 or until the welt strip is broken and the broken end passes between the feed rolls 4 and 6. In either case, as soon as the end of the welt passes from between the feed rolls 4 and 6, the feed rolls immediately are brought together by the spring 214, tripping the latch 304 and allowing the spring 150 to act to throw the stop finger 270 into the groove 266 and stop the rotation of the reel 244 and the oscillation of the arm 320. The feed rolls 4 and 6 are the only parts which continue to run and they will run idly until the power is shut off.

It is to be noted that there are two grooving knives 10 and 12 and that they are rocked to alternately present one or the other of the knives to groove the welt. It is, therefore, possible to use grooving knives which will cut in the welt a groove the sides of which are not necessarily symmetrical. For example, knives may be employed which will cut a substantially V-shaped groove in the welt one side of which may be steeper than the other. When a groove, the sides of which are not symmetrical, is cut, the two knives viewed toward their cutting edges are, of course, oppositely symmetrical, whereas when a groove, the sides of which are symmetrical, is cut, the two knives are of identical shape. It is also to be noted that whatever the direction of progress of the welt across the welt table, the grooving knife operates before the beveling knife. It is of advantage to groove the welt before it is beveled, because the grooving cut is the more difficult to make, and the welt, before it is beveled, presents a firmer strip for the grooving knife to operate upon than the welt after it is beveled. The bevel cut is easier to make, and the fact that a portion of the welt strip has been removed by the grooving knife does not render the welt strip so yielding that the beveling knife cannot operate properly upon its edge.

While the preferred embodiment of the present invention has been specifically illustrated and described, it is to be understood that the present invention is not limited to its preferred embodiment but may be embodied in other constructions within the scope of the invention as defined in the following claims:—

1. A machine for preparing welts having, in combination, means for supporting and guiding a welt strip, and forwardly and rearwardly directed grooving knives for grooving the welt strip when it is passed either forwardly or backwardly through the machine.

2. A machine for preparing welts having, in combination, means for supporting and guiding a welt strip, two oppositely directed grooving knives, and means for supporting the knives having provision for bringing either knife into operative position to groove the welt and for removing the other knife from operative position.

3. A machine for preparing welts having, in combination, means for supporting and guiding a welt strip, two oppositely directed grooving knives, and means for supporting the grooving knives having provision for alternately bringing each knife into operative position to groove the welt strip and at the same time withdrawing the other knife from operative position.

4. A machine for preparing welts having, in combination, means for supporting and guiding a welt strip, two oppositely directed grooving knives, a carrier for supporting the knives, and means for rocking the carrier to alternately present each knife in position to groove the welt strip, so that the welt strip may be grooved when it is passed either forwardly or backwardly through the machine.

5. A machine for preparing welts having, in combination, a work table for supporting a welt strip, a presser foot above the work table and having two work engaging surfaces inclined at an obtuse angle to each other, two oppositely directed grooving knives located respectively adjacent to the two work engaging surfaces of the presser foot, a carrier for the knives and the presser foot, and means for rocking the carrier to present either surface of the presser foot together with the adjacent knife to the welt.

6. A machine for preparing welts having, in combination, means for supporting and guiding a welt strip, power driven means for drawing the welt strip through the machine, two oppositely directed knives for cutting the welt strip, means for supporting the two knives having provision for presenting either knife in operative position to cut the welt, and means for throwing the power off and on arranged so that the power cannot be thrown on when one of the knives is in operative position.

7. A machine for preparing welts having, in combination, means for supporting and guiding a welt strip, power driven means for drawing the welt strip forwardly through the machine, forwardly and backwardly directed grooving knives, a knife carrier, means for rocking the knife carrier to present the knives alternately in position to groove the welt, and means for throwing the power off and on arranged to be locked so that the power cannot be thrown on when the knife carrier is rocked to present the forwardly directed grooving knife to the welt.

8. A machine for preparing welts having, in combination, power driven means for feeding the welt through the machine, cutting means for operating upon the welt, and means for reeling the welt as it is delivered from the feeding means, comprising a power driven reel and a welt guide for the reel which is oscillated back and forth longitudinally of the reel to lay the welt criss-crossed thereon to build up an open work welt roll.

9. A machine for preparing welts having, in combination, power driven means for feeding the welt through the machine, cutting means for operating upon the welt, and means for reeling the welt as it is delivered from the feeding means, comprising a frictionally driven reel, and a welt guide for the reel which is oscillated longitudinally of the reel in timed relation thereto to lay the welt criss-crossed thereon to build up an open work roll.

10. A machine for preparing welts having, in combination, power driven means for feeding a welt strip through the machine, cutting means for operating upon the welt, means for reeling the welt as it is delivered from the feeding means, comprising a frictionally driven welt reel, a welt guide for the reel arranged to be freely movable to and from the reel and so positioned that the tension upon the welt strip passing to the reel holds the guide against the face of the welt roll being wound, and means for oscillating the welt guide longitudinally of the welt reel to lay the welt criss-crossed thereon to build up an open work welt roll.

11. A machine for preparing welts having, in combination, power driven means for feeding the welt through the machine, cutting means for operating upon the welt, and means for reeling the welt as it is delivered from the feeding means, comprising a welt reel and an eccentric sleeve on the reel having a finger thereon arranged to be turned against the surface of the reel to grip the end of the welt.

12. A machine for preparing welts having, in combination, power driven means for feeding the welt through the machine, cutting means for operating upon the welt, and means for reeling the welt as it is delivered from the feeding means, comprising a frictionally driven welt reel, a welt guide for the reel mounted upon an arm which is free to swing to and from the surface of the welt reel, said welt guide and arm being so positioned that the tension of the welt being wound holds the welt guide against the surface of the welt roll being wound, and means for oscillating the arm to move the welt guide back and forth longitudinally of the welt reel in timed relation therewith to lay the welt criss-crossed upon the welt reel and build up an open work welt roll.

13. A machine for preparing welts having, in combination, power driven feed rolls for drawing the welt through the machine, cutting means for operating upon the welt, means for reeling the welt after it passes through the feed rolls, and means acting automatically to stop the welt reeling mechanism when the end of the welt passes from between the feed rolls.

14. A machine for preparing welts having, in combination, feed rolls for drawing a welt through the machine arranged to be held apart by the welt between them, cutting when there is no welt between them, cutting means for operating upon the welt, power driven means for reeling the welt, and means connected with the feed rolls and the reeling mechanism and acting automatically to stop the reeling mechanism when the feed rolls move together.

15. A machine for preparing welts having, in combination, power driven feed rolls for drawing the welt strip forwardly through the machine, a work table over which the strip is drawn by the feed rolls, gages for positioning the welt upon the work table, a knife or knives for cutting the welt strip, manually operable means for separating the feed rolls and moving the gages so that a welt strip may be placed in the machine, and means connected to said manually operable means and operated by each actuation thereof for alternately presenting a forwardly or a backwardly directed knife edge in position to groove the welt.

16. A machine for preparing welts having, in combination, power driven feed rolls for drawing a welt strip forwardly through the machine, manually operable means for separating the feed rolls so that a welt strip may be placed between them, a grooving knife or knives, and means connected to said manually operable means and operated by each actuation thereof for alternately presenting a forwardly or a backwardly directed knife edge in position to cut the welt.

17. A machine for preparing welts having, in combination, a work table, gages for positioning the welt strip upon the work table, manually operable means for moving the gages so that a welt strip may be placed in the machine, and means for cutting the welt strip comprising a knife or knives connected to said manually operable means and operated by each actuation thereof having provision for alternately presenting a forwardly or a backwardly directed knife edge in position to operate upon the welt strip.

18. A machine for preparing welts having, in combination, means for supporting and guiding a welt strip, two oppositely directed cutting knives, and a treadle connected with the cutting knives and operating upon each depression thereof to present the two knives alternately in position to cut the welt strip.

19. A machine for preparing welts having, in combination, means for supporting and guiding a welt strip, a knife or knives, and a treadle connected to the knife or knives and operating upon each depression thereof to alternately present a forwardly or a backwardly directed knife edge in position to cut the welt strip.

20. A machine for preparing welts having, in combination, power driven feed rolls for drawing a welt strip forwardly through the machine, a reel for winding the welt strip, mechanism for driving the reel, automatic means acting on the reel driving mechanism for rendering it inoperative to cause the reel to be no longer driven after the end of the welt strip passes from between the feed rolls, and manually operable means for separating the feed rolls for the insertion of the welt strip and acting on the reel driving mechanism for rendering it again operative for driving the reel.

21. A machine for preparing welts having, in combination, means for supporting and guiding a welt strip, a cutting knife or knives, and means for presenting a backwardly and a forwardly directed knife edge in position to cut the welt comprising a pawl and ratchet mechanism upon the successive operations of which the two cutting edges are alternately brought into operative position.

22. A machine for preparing welts having, in combination, means for supporting and guiding a welt strip, cutting knives for operating upon the welt as it passes through the machine, feed rolls for drawing the welt strip through the machine, a spring yieldingly pressing the feed rolls together against the tension of which the feed rolls are held separated by the welt, a power driven reel for winding the welt after it passes through the feed rolls, and means for stopping the reel comprising a pawl which is tripped by the movement of the feed rolls when they are moved together after the end of the welt has passed between them.

23. A machine for preparing welts having, in combination, means for supporting and guiding a welt strip, means for feeding the welt strip, cutting knives for operating upon the welt strip, a power driven reel for winding the welt strip after it has been operated upon, a grip for holding the end of the welt on the reel, and means for stopping the reel with the grip always in substantially the same position.

24. A machine for preparing welts having, in combination, means for guiding and feeding a welt strip, cutting means for operating upon the welt strip, a reel for winding the welt as it is delivered from the feeding means, a welt guide, an arm upon the end of which the welt guide is mounted, a swinging frame upon which the arm is pivotally mounted so that when the arm oscillates relatively to the frame the welt guide oscillates longitudinally of the reel, a shaft upon which the swinging frame is mounted to turn so that when the frame turns about the shaft the welt guide moves toward or from the welt reel, and mechanism for oscillating the arm relatively to the swinging frame comprising a sliding block mounted to reciprocate upon the shaft, a lever arm mounted on the swinging frame and connected to the arm upon which the welt guide is mounted, a connection between the sliding block and the lever arm mounted on the swinging frame for transmitting the reciprocating motion of the block to oscillate the arm, and a connection between the sliding block and a lever mounted on the machine frame for reciprocating the block, one of said lever connections to the block having provision for allowing a relative turning movement around the shaft between the lever and the block, so that the swinging frame is free to turn about the shaft.

25. A machine for preparing welts having, in combination, means for operating upon a welt strip, a reel for winding the welt strip after it has been operated upon, means for driving the reel including a clutch, mechanism for releasing the clutch and braking the reel to stop it, a spring tending to operate said clutch-releasing mechanism and stop the reel, a latch opposing the spring and holding said mechanism in inoperative position, and means for tripping the latch to stop the reel after the welt strip has been operated upon.

26. A machine for preparing welts having, in combination, means for supporting and guiding a welt strip comprising a work table and a welt engaging gage or gages coöperating therewith, a reel for winding the welt strip, mechanism for driving the reel, automatic means acting on the reel driving mechanism for rendering it inoperative to cause the reel to be no longer driven after the welt strip has been operated upon by the machine, and manually operable means for moving the work engaging gage or gages for the insertion of a new welt strip and acting on the reel driving mechanism for rendering it again operative for driving the reel.

27. A machine for preparing welts having, in combination, a work table, a presser foot, an edge gage, feed rolls for drawing the welt strip over the work table, a reel for winding the welt, mechanism for driving the reel, automatic means acting on the reel driving mechanism for rendering it inoperative to cause the reel to be no longer driven after the welt strip has been operated upon by the machine, and manually operable means for raising the presser foot, moving the edge gage, separating the feed rolls and acting on the welt driving mechanism for rendering it again operative for driving the reel.

28. A machine for preparing welts having, in combination, a work table, two oppositely directed knives above the work table, a carrier upon which the knives are mounted, a presser foot, a rocking frame supporting the knife carrier and presser foot, means for rocking the rocking frame to depress either knife nearer to the work table, means for adjusting the knife carrier bodily to and from the presser foot to vary the distance that the knives project below the presser foot, and adjusting means for turning the knife carrier relatively to the presser foot to adjust the knives so that each knife projects the same distance below the presser foot.

29. A machine for preparing welts having, in combination, a work table, two oppositely directed knives above the work table, a carrier upon which the knives are mounted, a presser foot, a rocking frame supporting the knife carrier and presser foot, means for rocking the rocking frame to depress either knife nearer to the work table, and means for adjusting the knife carrier relatively to the presser foot so that each knife may cut to the same depth in the welt strip.

30. A machine for preparing welts having, in combination, means for supporting and guiding a welt strip, means for cutting the welt strip comprising a knife or knives and having provision for presenting a backwardly directed knife edge to the welt when the welt strip is passed forwardly through the machine and for presenting a forwardly directed knife edge to the welt strip when the welt strip is passed backwardly through the machine, and power driven means for drawing the welt strip forwardly through the machine having provision so that the power cannot be thrown on when a forwardly directed knife edge is presented to the welt strip.

31. A machine for preparing welts having, in combination, means for drawing and guiding a welt strip through the machine, means for cutting the welt strip when the welt strip is drawn past it, and manually operable means for re-arranging the cutting means to cut the welt strip when it is drawn either forwardly or backwardly past the cutting means.

32. A machine for preparing welts having, in combination, means for drawing a welt strip through the machine, cutting means for operating upon the welt strip, a reel for reeling the welt strip as it passes through the machine, and means acting automatically to stop the welt reel after the strip of welting has been operated upon.

33. A machine for preparing welts having, in combination, means for drawing a welt strip through the machine, cutting means for operating upon the welt strip, a reel for reeling the welt strip as it passes through the machine, and means acting automatically to stop the welt reel if the welt strip breaks.

34. A machine for preparing welts having, in combination, power driven means for drawing a welt strip through the machine, cutting means for operating upon the welt, a welt reel for reeling the welt, and a welt guide arranged to lie against the face of the welt roll being wound on the reel and to reciprocate longitudinally of the reel to lay the welt criss-crossed thereon to build up an open work welt roll.

35. A machine for preparing welts having, in combination, a work table, cutting knives for operating upon the welt as it passes over the work table, and means for positioning the welt upon the work table comprising a plurality of independently movable edge gages for engaging the same edge of the welt, a spring for each edge gage for pressing it against the edge of the welt, and means for moving each of the edge gages away from the edge of the welt so that another welt may be placed upon the table.

36. A machine for preparing welts having, in combination, means for supporting and guiding a welt strip, two oppositely directed grooving knives for cutting a groove in the surface of the welt, a rocking carrier upon which the two grooving knives are mounted, and means for rocking the carrier to present the knives alternately in position to groove the welt comprising an eccentric and manually operable means for turning the eccentric through an angle of 180° upon each actuation of said manually operable means.

37. A machine for preparing welts having, in combination, means for supporting and guiding a welt strip, cutting means for operating upon the welt strip, and means for winding the strip after it has been operated upon including a reel and a welt guide arranged to lie against the face of the welt roll which is wound upon the reel and comprising three rolls mounted side by side upon a common shaft, the middle roll being smaller than and mounted eccentrically to the two outer rolls.

38. A machine for preparing welts having, in combination, a work table, a cutting knife for operating upon the welt as it passes over the work table, edge gaging means for positioning the welt upon the work table comprising a plurality of independently movable edge gages for engaging the same edge of the welt, a plurality of sliding guide bars, each rigidly connected to one of the edge gages and mounted to slide in a line substantially parallel with the work table and at substantially right angles to the direction of the welt strip in order that the welt guides may be moved independently over the work table when engaged by an irregular enlargement in the welt strip, a plurality of springs, each connected to one of the edge gages for yieldingly opposing the movement of the gage when engaged by an enlargement in the welt strip, and a single manually operable means for simultaneously moving all of the edge gages so as to permit a welt to be placed upon the table in position to be operated upon.

THOMAS HERBERT SEELY.

Witnesses:
CHESTER EUGENE ROGERS,
MABEL ANNIE SWETT.

Copies of this patent may be obtained for five cents each, by addressing the "Commissioner of Patents, Washington, D. C."

It is hereby certified that in Letters Patent No. 1,143,078, granted June 15, 1915, upon the application of Thomas Herbert Seely, of Boston, Massachusetts, for an improvement in "Machines for Preparing Welts," errors appear in the printed specification requiring correction as follows: Page 5, line 32, for the reference-numeral "247" read *246;* page 6, line 107, for the word "axle" read *axis;* and that the said Letters Patent should be read with these corrections therein that the same may conform to the record of the case in the Patent Office.

Signed and sealed this 27th day of July, A. D., 1915.

[SEAL.]

R. F. WHITEHEAD,
*Acting Commissioner of Patents.*